United States Patent [19]
Green

[11] Patent Number: 6,116,910
[45] Date of Patent: Sep. 12, 2000

[54] DENTAL HYGIENE AND APPOINTMENT REMINDER

[76] Inventor: Christopher E. Green, 520 E. Denny Way, Seattle, Wash. 98122

[21] Appl. No.: 09/343,741

[22] Filed: Jun. 30, 1999

[51] Int. Cl.[7] .................................................. G09B 23/28
[52] U.S. Cl. ........................... 434/263; 434/433; 40/299; 40/630; 273/67; 273/117
[58] Field of Search ............................... 434/263, 4, 433; 283/67, 117; 462/25; 40/299, 625, 628, 630

[56] References Cited

U.S. PATENT DOCUMENTS

| | | |
|---|---|---|
| 1,458,782 | 6/1923 | Shapiro . |
| 4,869,531 | 9/1989 | Rees ........................................... 283/67 |
| 5,102,171 | 4/1992 | Saetre ......................................... 283/117 |
| 5,244,394 | 9/1993 | Serabian-Musto ....................... 434/263 |
| 5,352,155 | 10/1994 | Fahey ......................................... 462/25 |
| 5,356,294 | 10/1994 | Odomo ...................................... 434/263 |
| 5,525,383 | 6/1996 | Witkowski ................................. 428/30 |
| 5,944,531 | 8/1999 | Foley ......................................... 434/263 |

OTHER PUBLICATIONS

Midas Oil Change Label, Feb. 23, 2000.

*Primary Examiner*—Sam Rimell
*Assistant Examiner*—Bina B. Miller

[57] ABSTRACT

A thin flat body of material, including static cling vinyl, capable of adhering electrostatically to vertical nonporous surfaces such as a bathroom mirror allowing it to be removed and reapplied repeatedly without leaving residue and further permiting writing and printing on the surface thereof. Said body of material also having preprinted on its front surface a depiction of teeth of the upper jaw (12) and of the lower jaw (13) with a means of conveying conditions and advice regarding dental hygiene (22) on the depiction of teeth by writing. In addition, an area is preprinted on the body of material for advertising (18) as well as an area for writing the date and time of a future appointment (20).

16 Claims, 3 Drawing Sheets

DENTAL HYGIENE AND APPOINTMENT REMINDER

CROSS-REFERENCE TO RELATED APPLICATIONS

Not applicable

BACKGROUND

1. Field of Invention

This invention relates to dental hygiene instructional devices and appointment reminders.

BACKGROUND

2. Description of Prior Art

Instructional devices used to teach dental hygiene and remind patients of their appointments have been the subject of patent protection.

Forgetfulness and lack of retention of information by patients are significant problems in the dental industry. Patients find it difficult to remember what problem areas have been identified by a dental service provider (e.g. dentist, hygienist or assistant) during an appointment and where the problem area is located in a patient's mouths. Forgetfulness also causes missed appointments.

The reason a patient may forget information is that dental patients are frequently apprehensive during appointments. Also, patients find it difficult to understand, and dental service providers find it difficult to explain to patients where the patients have hygiene problems to which they should direct their attention. This problem relates to the fact that the areas described in a mouth are not easily seen by a patient and to the extent they can be seen, explanations are difficult to understand because of the inversion of images in a mirror.

Several devices used to explain dental hygiene to patients have been the subject of patent protection. A device intended to provide dental instruction to a patient is found in U.S. Pat. No. 5,356,294 to W. Odomo (1994). The Odomo patent allows a dental service provider to prepare a representation of an individual patient's teeth in order to explain the condition of the teeth and treatments for that patient. Although this device provides an individual account for a particular patient, the device is not intended to provide a patient with an account of dental hygiene that can be taken from the appointment to use for continuous reference when performing dental hygiene tasks. Simply, no consideration is made for a patient's forgetfulness. Further, the preparation of a patient's individual teeth using the Odomo patent can be time consuming and is not convenient for the patient who only requires routine hygiene tasks. Finally, it does not provide a means of reminding a patient of a future appointment.

A greeting card format is provided in U.S. Pat. No. 5,244,394 to J. Serabian-Musto (1993). This patent provides a graphic representation of teeth and may provide information regarding dental hygiene. However, this patent does not provide a reminder tailored to an individual patient and is not in a format that can be conveniently referenced while performing dental hygiene tasks such as brushing and flossing teeth.

Another greeting card format is shown in U.S. Pat. No. 5,102,171 by R. Saetre (1990). The Saetre patent recognizes the utility of using static cling vinyl for electrosatically adhering a body of printed material to a nonporous surface. However, the intent of the Saetre patent is to use the properties of static cling vinyl to decorate, not to convey information.

U.S. Pat. No. 4,869,531 to M. Rees (1989) provides an apparatus and method for documenting the findings of a physical examination on stickers. This patent is not meant to record dental hygiene information and the gathered information is for record keeping and not to convey information to a patient. The stickers use an adhesive compound that is not easily removed after application.

Regarding appointment reminders, other inventions have recognized that many patients forget their appointments with dental service providers resulting in lost opportunities to provide needed dental care and in lost revenue. U.S. Pat. No. 5,352,155 to P. Fahey (1994) demonstrates the need to provide a reminder of an appointment in a prominent place, such as a calendar. However the reminder device of the Fahey patent is not practical to place on a nonporous surface such as a bathroom mirror since the part of the manifolded invention that is to be used as a reminder is an adhesive backed sticker. The adhesive backing would be difficult to remove from the mirror after a patient's next appointment with a dental service provider. Also, no provision is made for providing information about dental hygiene.

All prior art suffers a number of disadvantages.

(a) none provide a simple way for a dental service provider to explain needed dental hygiene to patients.
(b) none provide a reminder of dental hygiene that is individual to a patient that a patient can take home.
(c) none provide a means for reminding a patient of dental hygiene tasks on a body of material that is easily adhered to and removed from a vertical surface.
(d) none provide a means for temporarily adhering a reminder that leaves no adhesive residue when removed.
(e) none provide a means for repeatedly removing and readhering a reminder.
(f) none provide a reminder that can be conveniently used on a bathroom mirror.
(g) none provide a daily reminder of a future appointment.
(h) none provide a means for advertising on an area seen repeatedly by a dental consumer.
(i) none combine the features of a dental hygiene reminder with an appointment reminder.

SUMMARY

In accordance with the present invention, a reminder of dental hygiene that a dental service provider may use to quickly provide a patient with a reminder of areas of a patient's teeth and gums that require attention with the date and time of a future appointment in a format and on a body of material that may be adhered electrostatically to a vertical surface.

OBJECTS AND ADVANTAGES

Accordingly, several objects and advantages of my invention are:

(a) to provide a product with detailed information about an individual patient's dental hygiene in a format that is easy to understand.
(b) to provide a means for a patient to be reminded of areas to emphasize in performing dental hygiene tasks.
(c) to provide a method that allows a dental service provider to quickly furnish information regarding an individual patient's dental hygiene.
(d) to provide for repetition in reminding patients of dental hygiene tasks and of future appointments.

(e) to provide a convenient means for adhering a body of material with dental hygiene information to a vertical surface.

(f) to provide a means for adhering a body of material with dental hygiene information to a vertical surface without adhesives that leave residue when the body of material is removed.

(g) to provide a means for advertising dental goods and services directly to a known dental service consumer.

(h) to provide a patient with a reminder of a future appointment with a dental service provider.

(i) to provide the above advantages on a single body of material.

Still further objects and advantages will become apparent from a consideration of the ensuing description and drawings.

DRAWING FIGURES

Reference Numerals in Drawings

Figure 1:
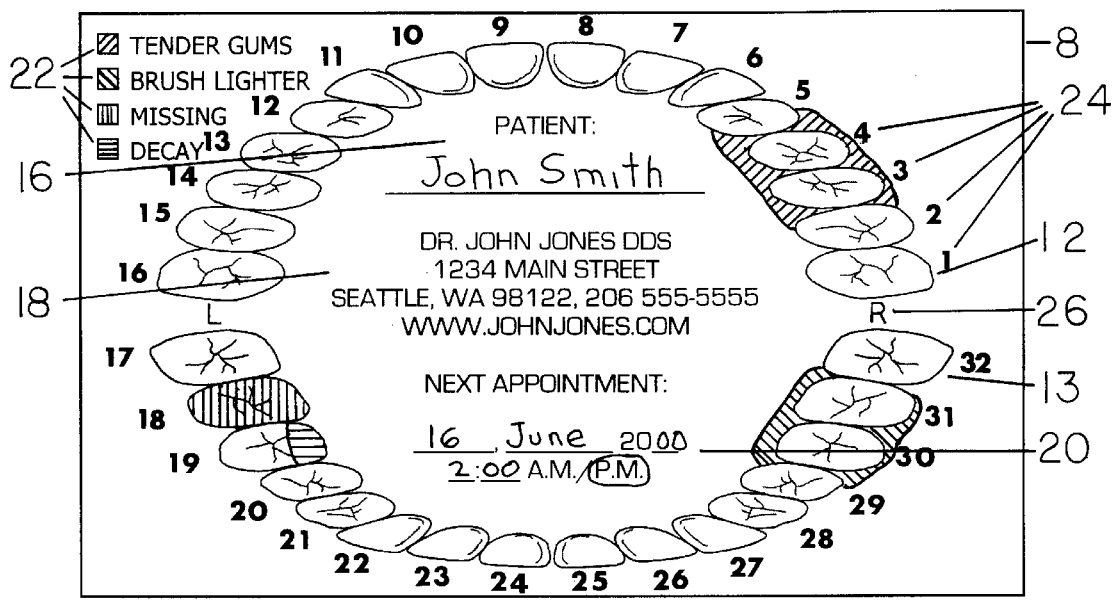
FIG. 1 shows the preferred embodiment of the dental hygiene and appointment reminder with hypothetical patient information recorded thereon. The invention is a thin flat sheet, therefore only the front view is shown.
Figure 2:
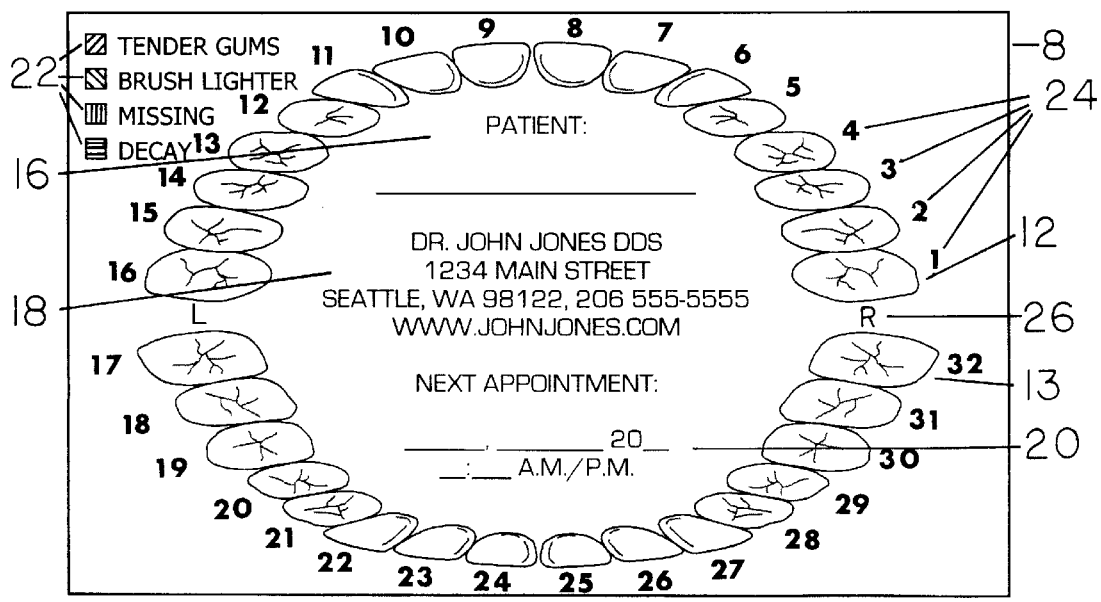
FIG. 2 shows the preferred embodiment without patient information recorded thereon.
Figure 3:
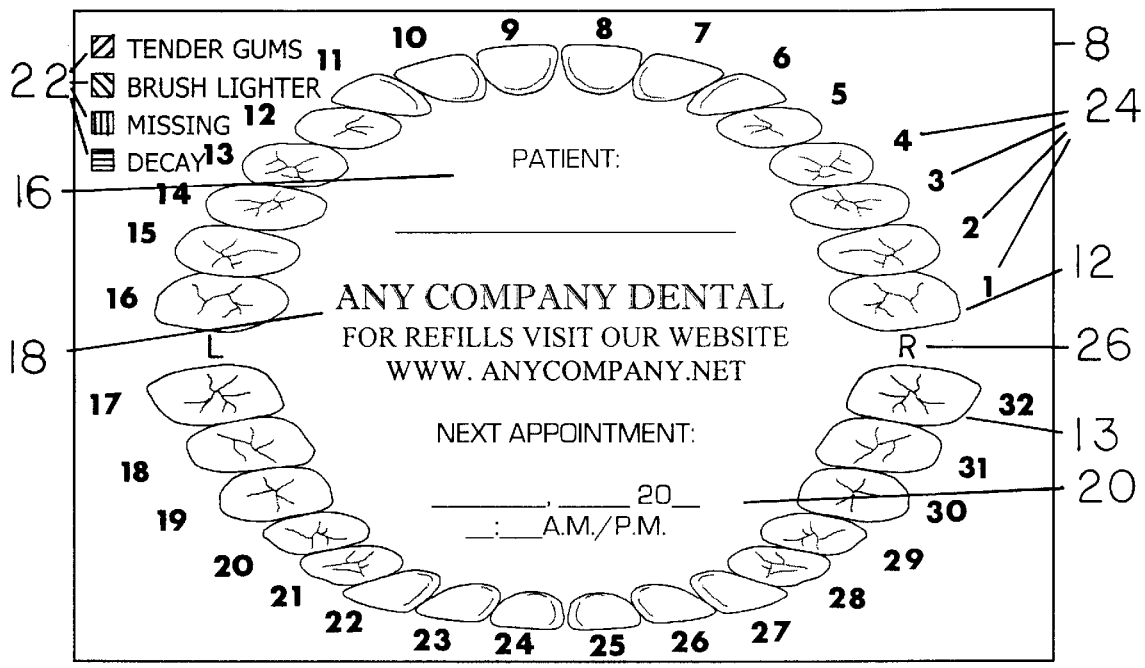
FIG. 3 shows the preferred embodiment of the dental hygiene reminder which emphasizes the advertising capabilities of the invention. The invention is a thin flat sheet, therefore only the front view is shown.

8 Reminder apparatus
10 Reminder—alternative
12 Upper teeth
13 Lower teeth
14 Upper teeth—alternative
15 Lower teeth—alternative
16 Patient name area
18 Advertising area
20 Appointment area
22 Color coding legend
24 Tooth numbering
26 Orientation indicator
28 Places of emphasis area
30 Bathroom mirror DESCRIPTION—Preferred Embodiment FIGS. 1–3

A preferred embodiment of the reminder apparatus in FIGS. 1 and 2 is identified by the reference numeral 8. The reminder apparatus is die-cut and consists of a flexible material, such as static cling vinyl, that is capable of being electrostatically adhered to a vertical surface. However, the reminder apparatus can consist of any other material or materials that cling to vertical surfaces, that can be repeatedly removed and readhered and on which items can be printed and which can be written on with a writing instrument. The body of material may be transparent or a variety of colors. The printed matter may also be a variety of colors.

The printed matter on the reminder apparatus 8 consists of depictions of the upper teeth 12 and lower teeth 13 which include all the teeth, including wisdom teeth, located in the upper jaw and the lower jaw of a typical person. In the preferred embodiment, there are sixteen teeth depicted on the representation of the upper teeth 12 and the same number on the representation of lower teeth 13.

The depictions of upper teeth and lower teeth may be numbered 24 with Arabic numerals from 1 through 32 in ascending order starting from number 1 represented by the far right tooth of the upper teeth 12. This numbering system uses the same numbers for each tooth as the Federation Dentaire International two digit tooth recording system that is standard throughout the dental industry. The depiction of teeth and thus the numbers are inverted, however each tooth remains correctly numbered according to this standard.

The depiction of the teeth is inverted as if looking into a mirror in order to make a patient's use of the dental hygiene aspect of the reminder apparatus convenient. The image corresponds with the mirror view so a patient sees an image of their mouth in the mirror that is identical to the view of the mouth that is depicted by the reminder apparatus. The orientation indicator 26 is shown in the embodiment between the depictions of upper teeth 12 and lower teeth 13 as "L" and "R" to abbreviate "left" and "right" in order to emphasis to the patient the inversion of the depiction.

Included on the reminder apparatus 8 under the word "patient" is an area to write a patient's name 16 for whom a reminder apparatus 8 is prepared. An advertising area 18 is provided to allow, as in the embodiment, the name, address and phone number of the dental service provider. Under the words "next appointment" is an appointment area 20 for writing the date and time of a future appointment for a patient.

A color coding legend 22 is provided in the preferred embodiment. The legend 22 portrays various colors to represent conditions and advice regarding teeth and gums. The conditions in the preferred embodiment are "decay", "brush lighter", "tender gums" and "missing". FIG. 1 reflects a hypothetical patient's reminder apparatus with information filled in over the teeth and gums with colors that correspond with the legend 22. Various colors can be used to illustrate the different conditions and advice so no attempt is made to convey the particular colors in FIG. 1.

In other embodiments, the boxes that contain each color in the legend 22 may be left blank for dental service providers to use color writing instruments to fill-in with colors of their own choosing. FIG. 2 reflects the preferred embodiment in its form before individual patient's information is filled in by a dental service provider as in FIG. 1.

FIG. 3 depicts a version of the reminder apparatus 8 that is identical to the preferred embodiment of FIGS. 1 and 2 except the advertising area 18 which in FIG. 3 emphasizes the reminder apparatus' usefulness in advertising a company's goods and services.

Figure 4:
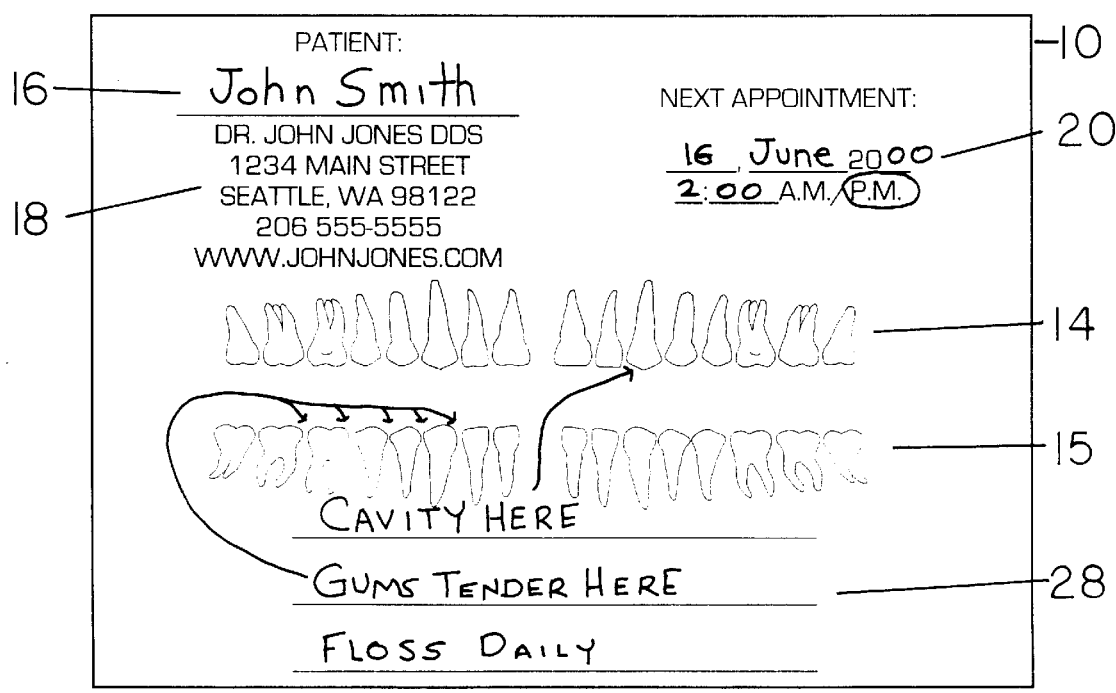
FIG. 4 shows an alternative embodiment of the dental hygiene reminder that does not use color coding or tooth numbering systems. The invention is a thin flat sheet, therefore only the front view is shown.

FIG. 4—Alternative Embodiment

There are various possibilities with regard to the depiction of teeth, and positions of the graphics and various spaces. This alternative reminder apparatus 10 emphasizes some of the various possibilities. Blank areas provide for areas of attention 26 for the dental service provider to annotated with conditions of the patient's teeth and gums. Also, with a writing instrument or instruments, which may be of different colors, arrows may be drawn that emanate from each respective area of attention 26 to indicate locations of the teeth or gums referenced for attention. The depiction of upper teeth 14 and lower teeth 15 of this embodiment extend straight across the alternative apparatus 10 and do not frame the reminder apparatus as in the preferred embodiment 8.

Advantages

From the description above, a number of advantages of my dental hygiene and appointment reminder become evident:

(a) It provides a method for dental service providers to quickly convey information regarding a patient's dental hygiene and then provide an accurate, detailed listing of problem areas.

(b) It provides a graphic means to show a patient problem areas of their teeth and gums and where to focus dental hygiene efforts such as brushing and flossing.

(c) A patient can cling a reminder to a surface in the patient's bathroom, where most dental hygiene tasks are carried out.

(d) A patient can easily remove and reapply a reminder apparatus to a mirror without leaving residue.

(e) The reminder apparatus can not be misplaced after it is adhered to a vertical surface.

(f) The presence of the appointment date helps avoid missed appointments.

(g) An area on the reminder apparatus allows companies to advertise to a known dental service consumer.

(h) The patient will be constantly reminded of needed treatment thus encouraging good dental hygiene.

(i) The combination of a variety of features listed above in one small apparatus is convenient for the patient and the dental service provider.

Figure 5:
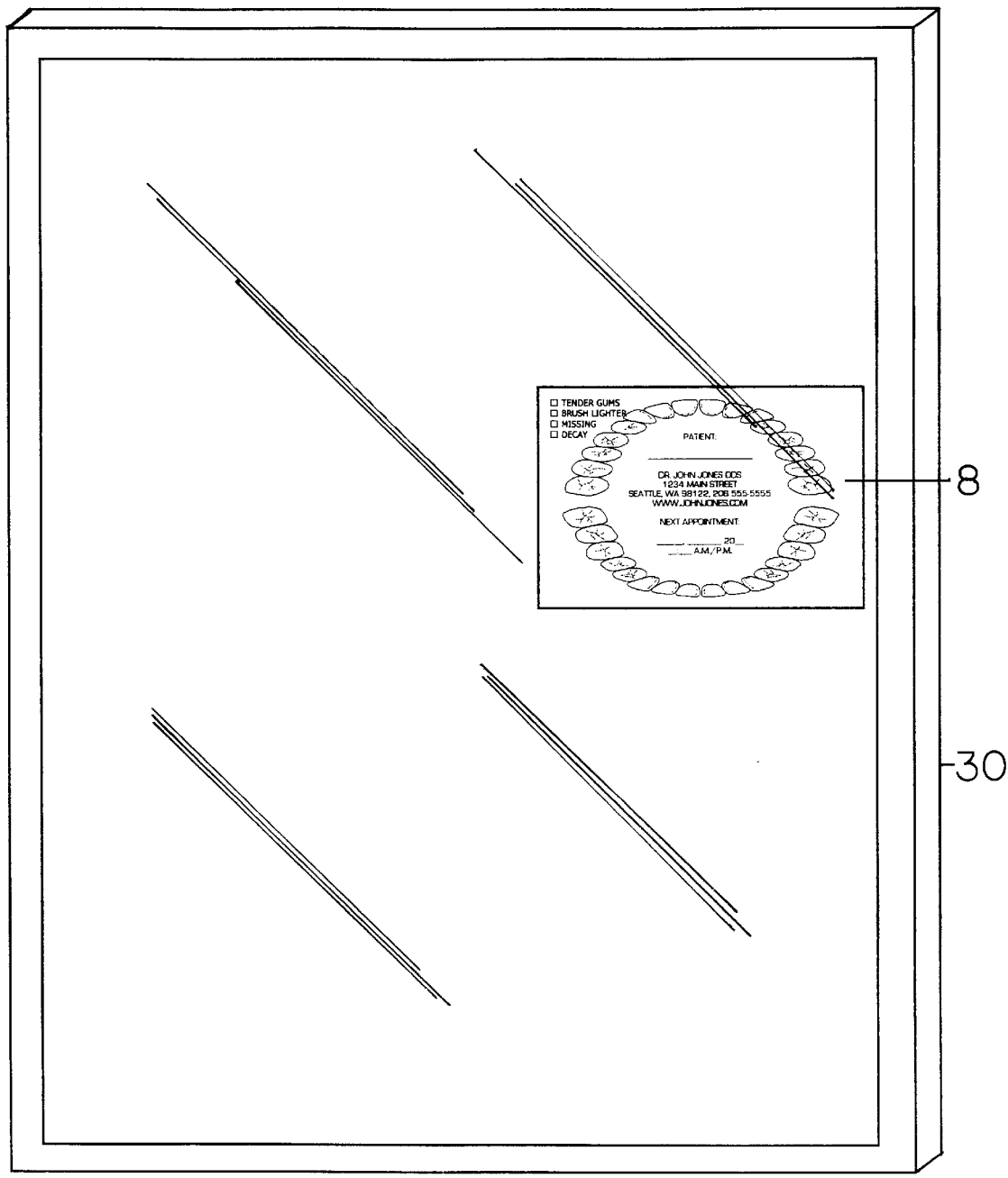
FIG. 5 shows the preferred embodiment applied to a bathroom mirror.

Operation—FIGS. 1, 2 and 5

The method of using the reminder requires that a patient first visit a dental service provider and have a dental examination. After the examination, the dental service provider takes a recording apparatus 8 and writes down the name or identifying information of the patient in the blank space in the patient name area 16. The dental service provider then writes with writing instruments of different colors on the depictions of the upper teeth 12 and lower teeth 13 or the adjacent gums to indicate the problem areas encountered during the exam using a color that corresponds to the color coding legend 22. The date and time of the patient's next appointment is then written in the appointment area 20.

The reminder is given to a patient to place on a nonporous surface such as a bathroom mirror 30. When a patient performs dental hygiene tasks such as brushing or flossing teeth, the patient can look at the reminder apparatus to be reminded to make more effort in some areas and perhaps less effort in others. A patient may open his or her mouth and see exactly the areas referenced on the reminder apparatus 8 without having to mentally invert the image. The image of a patient's open mouth is the same as the image of the teeth 12, 13 in the preferred embodiment. Every time the patient uses a bathroom where the reminder apparatus is hung, the patinet is reminded of the areas of the teeth and gums emphasized by the dental service provider. The patient also has a constant reminder of the next dental appointment while an advertiser can use the principle of repetition to constantly remind a known dental service consumer of their goods or services.

Conclusion, Ramification, and Scope

Accordingly, the reader will see that the dental hygiene and appointment reminder is a convenient way to convey and remind patients of ways to improve dental hygiene. Furthermore, the reminder apparatus has the additional advantages in that it permits providers of goods and services to advertise on the reminder apparatus permits the adhering of the reminder apparatus to a surface with a material that can be removed easily and leave no adhesive residue permits reapplication of the reminder apparatus permits a combination of desirable features in one reminder apparatus thereby making it convenient to use and prepare allows a patient to observe the areas identified by the dental service provider while performing dental hygiene tasks such as brushing and flossing permits the use of repetition to improve dental hygiene, advertise and remind patients of appointments Although the description above contains many specifications, these should not be construed as limiting the scope of the invention but merely providing embodiments of the invention. For example, the reminder apparatus may have a variety of depictions of teeth and gums. Also, teeth and gums may not be represented anatomically as in the displayed embodiments but rather in the form of cartoons suitable for children. Also, the material of the body of the reminder may be made of a material other than static cling vinyl that can easily adhere to a surface and leave no adhesive residue when removed. Thus the scope of the invention should be determined by the appended claims and their legal equivalents, rather than by the examples given.

What is claimed is:

1. A home-use dental care and appointment reminder that temporarily adheres to vertical surfaces for a dental patient provided by a dental service provider, comprising:

a single, flat sheet of material having opposing front and rear surfaces, non-permanent adhering means adapted for adhering said rear surface of said flat sheet to a vertical surface by said dental patient so that said sheet can be temporarily placed upon a conspicuous vertical surface such as a bathroom mirror, and easily removed therefrom, said front surface having a diagram of a set of human teeth printed thereon in reverse image so that said dental patient upon facing said reminder and performing oral hygiene tasks at home sees a mirror image set of teeth, said front surface with said printed human teeth diagram also showing pre-printed legend means for indicating a dental condition, said front surface further adapted to show hand written markings indicating the areas in which dental work was done on said patient's teeth, instructions for appropriate dental hygiene care and date and time reminder for the next appointment for said dental patient, and whereby said single, flat sheet can be easily removed and replaced with an updated reminder at the next dental appointment by said dental service provider.

2. The patient reminder of claim 1 wherein said material is composed of static cling vinyl.

3. The patient reminder of claim 1 wherein said material is electrostatically adherable to said vertical surface.

4. The patient reminder of claim 1 further including a plurality of dental hygiene advice preprinted on said front surface.

5. The patient reminder of claim 1 further including a plurality of dental conditions preprinted on said front surface.

6. The patient reminder of claim 1 further including an area to write the time and date of a future appointment with said dental service provider.

7. The patient reminder of claim 1 further including preprinted advertising on said front surface.

8. The patient reminder of claim 1 further including said dental service provider's name and information for contacting said dental service provider.

9. A home-use dental care and appointment reminder that temporarily adheres to vertical surfaces for a dental patient provided by a dental service provider, comprising:

a single flat sheet of material having opposing front and rear surfaces, said rear surface being electrostatically adherable to a vertical surface by said dental patient so that said sheet can be temporarily placed upon a conspicuous surface such as a bathroom mirror, and easily removed therefrom, said front surface having a diagram of a set of human teeth printed thereon in reverse image so that said dental patient upon facing said reminder and performing oral hygiene tasks at home sees a mirror image set of teeth, said front surface with said printed human teeth diagram also showing pre-printed legend means for indicating a dental condition, said front surface further adapted to show hand written markings thereon indicating the areas in which dental work was done on said patent's teeth, instructions for appropriate dental hygiene care and date and time reminder for the next appointment for said dental patient, said front surface also having advertising spaces printed thereon to enable promotion of goods and services to a patient, and whereby said single, flat sheet can be easily removed and replaced with an updated reminder at the next appointment by said dental service provider.

10. The patient reminder of claim 9 wherein said material is composed of static cling vinyl.

11. The patient reminder of claim 9 further including a plurality of dental hygiene advice preprinted on said front surface.

12. The patient reminder of claim 9 further including a plurality of dental conditions preprinted on said front surface.

13. The patient reminder of claim 9 further including said dental service provider's name and information for contacting said dental service provider.

14. A method of in home-use reminder for a dental patient provided by a dental service provider for appropriate teeth care and future dental appointments comprising the steps of:

(a) providing a reminder means consisting a single, flat sheet of material having opposing front and rear surfaces, said rear surface having non-permanent adhering means for being able to temporarily place said reminder means on a vertical surface, said front surface having printed thereon a diagram of a set of human teeth in reverse image and further including pre-printed legend means for indicating a dental condition, said front surface further adapted for hand writing appropriate hygiene care and the date of said patient's next appointment, (b) marking on said diagram of said reminder means the represented area to which a dental hygiene condition applies to said patient, (c) marking on said printed teeth diagram of said reminder means dental hygiene advice that applies to said patient, (d) marking on said front surface of said reminder means a future appointment by said patient by said dental service provider, (e) temporarily adhering said single, flat sheet to a bathroom mirror or other vertical surface in said dental patient's home by said dental patient with said non-permanent adhering means.

15. The method of claim 14 wherein a patient marks on said diagram of said reminder means the location of dental hygiene advice that applies to said patient.

16. The method of claim 14 wherein a patient marks on said diagram of said reminder means the location of any dental hygiene condition that applies to said patient.

* * * * *